United States Patent [19]

Campion et al.

[11] Patent Number: 5,720,909
[45] Date of Patent: Feb. 24, 1998

[54] METHOD OF MANUFACTURING SILICA POWDER WITH SPHERICAL GRAINS

[75] Inventors: Jean-Florent Campion, Bois-Colombes; Rémi Fauche, Bezons; Pierre Rebreyend, Lille, all of France

[73] Assignee: Alcatel Fibres Optiques, Bezons Cedex, France

[21] Appl. No.: 629,566

[22] Filed: Apr. 9, 1996

[30] Foreign Application Priority Data

Apr. 10, 1995 [FR] France ................... 95 04252

[51] Int. Cl.$^6$ ................... B22D 11/01
[52] U.S. Cl. ................... 264/15
[58] Field of Search ................... 264/15, 1.21, 434

[56] References Cited

U.S. PATENT DOCUMENTS

| | | | |
|---|---|---|---|
| 3,146,281 | 8/1964 | Krystyniak et al. | 264/15 |
| 3,227,783 | 1/1966 | Williams | 264/15 |
| 4,592,707 | 6/1986 | Borer et al. | 425/7 |
| 4,840,755 | 6/1989 | Nakazawa et al. | 264/15 |
| 5,112,612 | 5/1992 | Garvey et al. | 424/400 |

FOREIGN PATENT DOCUMENTS

| | | |
|---|---|---|
| 0 224 659 A3 | 6/1987 | European Pat. Off. . |
| 0 555 947 A1 | 8/1993 | European Pat. Off. . |
| 0 578 553 A1 | 1/1994 | European Pat. Off. . |
| 2 315 313 | 1/1977 | France . |

OTHER PUBLICATIONS

*Patent Abstracts of Japan*, vol. 12, No. 84 (C–482) 17 Mar. 1988 corresponding to JP-A-62 221434 (Nara Yorioki et al) dated Sep. 29, 1987.

*Primary Examiner*—Christopher A. Fiorilla
*Attorney, Agent, or Firm*—Sughrue, Mion, Zinn, Macpeak & Seas, PLLC

[57] ABSTRACT

A method for producing spherical silica grains using a cylinder having its axis inclined to the horizontal and having an inside wall made from a material that is significantly softer than silica. The cylinder has an entry chute for non-spherical silica grains and an exit chute for spherical cylinder grains. According to the method, a rotary member is rotated at high speed by a drive shaft having its axis coincident with the axis of the cylinder. The rotary member includes at least one paddle vertically aligned with the entry chute so that silica grains entering via the entry chute are thrown by the paddle against the inside wall of the cylinder and follow a path most of which is against the wall before leaving via the exit chute. As a result, the silica graining have a spherical shape.

4 Claims, 1 Drawing Sheet

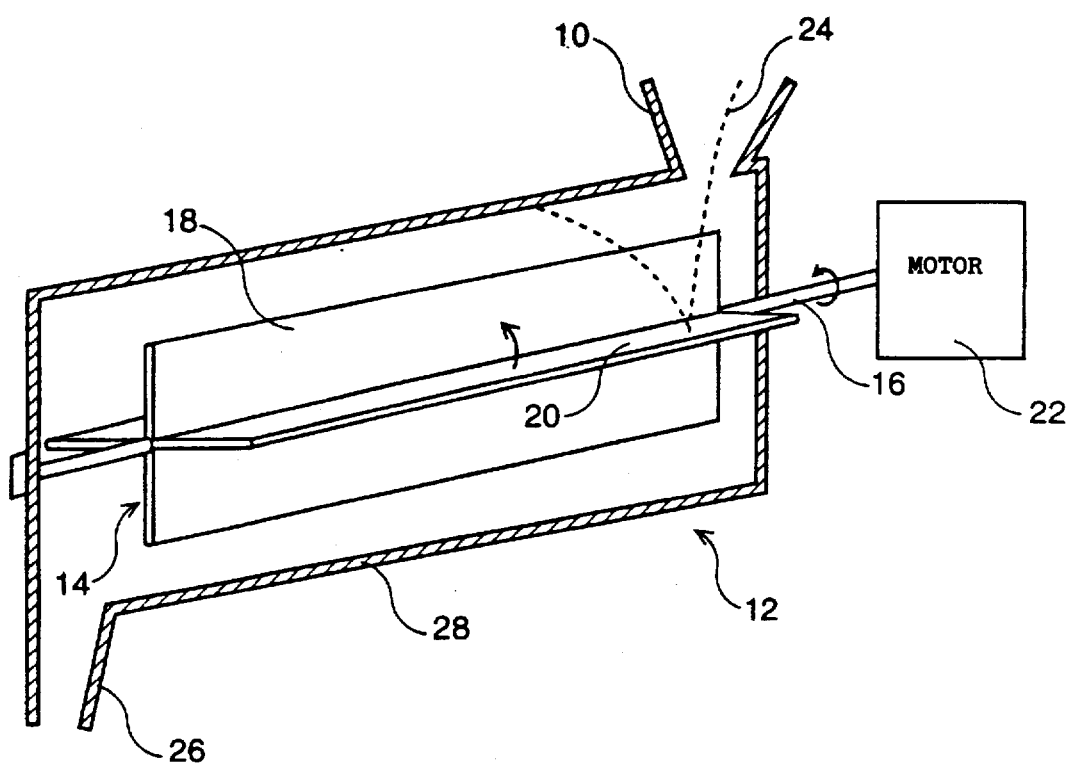

METHOD OF MANUFACTURING SILICA POWDER WITH SPHERICAL GRAINS

BACKGROUND OF THE INVENTION

1. Field of the Invention

The present invention concerns the manufacture of silica powder and in particular a method of manufacturing silica powder with spherical grains specifically intended to be used in the fabrication of optical fiber preforms.

2. Description of the Prior Art

The fabrication of an optical fiber preform is well known in this art. One fabrication method described in U.S. patent application Ser. No. 08/087,060 of 7 Jul. 1993 now abandoned consists in forming a suspension in water of synthetic silica soot having a specific area of less than 80 $m^2/g$ and containing 50% to 75% by weight silica, gelling the suspension, drying the gel obtained using microwaves, fractioning the dried gel into silica grains having a diameter between 10 µm and 1 mm and screening between 100 µm and 500 µm. The silica grains obtained in this way are then densified in a furnace at a temperature of approximately 1,300° C. before they are deposited by plasma spraying and melting onto a primary preform, as described, for example, in the article by Le Sergent et al "Preform Technologies for Optical Fibers" in Electrical Communication, Vol. 62, No. 314, 1988. The object of densifying the grains before making the preform is to increase the rate of deposition of the grains onto the primary preform.

Known as the sol-gel method, this fabrication method unfortunately has the drawback that the grains obtained do not have the required spherical shape; they are usually rectangular or ovoid in shape. This is a problem when the grains are used to make a preform. The preform obtained contains bubbles of gas trapped between the grains. These bubbles make the preform and the resulting optical fiber fragile by creating microstresses that can cause the optical fiber to break. Furthermore, if the grains are not spherical they do not flow well into the plasma flame during fabrication of the preform.

For this reason a primary object of the invention is to provide a device for producing spheroidal grains for application to optical fibers.

Another object of the invention is to provide a method of producing spherical silica grains to be used to make optical fiber preforms.

SUMMARY OF THE INVENTION

In one aspect, the present invention therefore consists in a method of producing spheroidal grains of silica consisting in imparting a high speed to the grains and maintaining them in contact with a wall that is significantly softer than silica so that abrasion of the surface of said grains as they roll along said wall throughout the length of their path thereon imparts a substantially spherical shape to said grains.

In another aspect the invention consists in a device for producing spheroidal grains of silica, comprising a cylinder having its axis inclined to the horizontal and an inside wall made from a material that is significantly softer than silica, said cylinder having an entry chute for non-spherical silica grains at the highest point on the wall of said cylinder and an exit chute for spherical silica grains at the lowest point on said wall of said cylinder, and a rotary member adapted to be rotated at high speed by a drive shaft having its axis coincident with the axis of said cylinder, said rotary member including at least one paddle vertically aligned with said entry chute so that silica grains entering via said entry chute are thrown by said paddle against said inside wall of said cylinder and follow a path most of which is against said wall before leaving via said exit chute.

BRIEF DESCRIPTION OF THE DRAWING

The aims, objects and features of the invention will emerge more clearly from a reading of the following description given with reference to the single figure which shows a preferred embodiment of a device in accordance with the invention for producing spheroidal silica grains.

DETAILED DESCRIPTION OF THE PREFERRED EMBODIMENT

The present invention concerns silica grains in sizes between 10 µm and 1 mm obtained by fractioning a silica gel; they are partly ovoid in shape and partly rectangular in shape.

In the device shown in the figure, the grains are fed into an entry chute 10 of a cylinder 12 inclined at approximately 10° to the horizontal, the entry chute being at the higher end of the cylinder.

The cylinder 12 contains a rotary member 14 that rotates on a shaft 16 that is preferably coincident with the axis of the cylinder; an alternative embodiment is feasible in which the rotation axis and the cylinder axis are not coincident. The rotary member 14 includes two (or more) paddles or blades 18 and 20 which are shown at right angles to each other in the figure.

The shaft 16 is driven by a motor 22 at a speed between 300 rpm and 3,000 rpm, a speed between 2,000 rpm and 3,000 rpm being preferred.

When the grains 24 enter the cylinder 12 via the chute 10 they are thrown at high speed against the inside wall 28 of the cylinder by one of the paddles 18 or 20 as shown in the figure. The particles thereafter tend to move along a path such that they are in contact with the inside wall 28 at all times, this path being helical in shape because of the inclination of the cylinder 12. The grains accordingly reach an outlet chute 26 from which they are recovered; if they have not acquired sufficient velocity for this, they drop onto one of the paddles of the rotary member and are again thrown against the inside wall 28.

One essential feature of the invention is that the inside wall 28 of the cylinder 12 is made from a synthetic material that is significantly softer than the silica, such as a plastics material, preferably polyamide resin. Consequently, the grains are not destroyed or broken up by rubbing on the wall 28 but rather, because of their high speed, roll along the wall 28 over a certain distance, as a result of which they acquire a substantially spherical shape. The distance the grains travel along the wall is obviously dependent on the inclination and the length of the cylinder. The greater the inclination of the cylinder, the faster the grains reach the outlet chute for a given cylinder length. For the grains to travel a sufficient distance along the wall to acquire a spherical shape the inclination must be optimal for the given length of the cylinder. The inclination of the cylinder, which is between 10° and 20°, is directly dependent on its length, which is preferably between 30 cm and 50 cm.

Without departing from the scope of the invention, this feature of causing the grains to roll at high speed a certain distance along a wall that is significantly softer than the silica could be applied in a device different from that described. For example, the wall could be mobile (rotating about an axis, for example) or the cylinder could be disposed vertically.

The spherical grains produced by the method of the present invention are particularly suitable for use in the induction plasma fusion process for making optical fiber preforms because of the total absence of bubbles in the glass, unlike conventional silica grains that have not been treated as described above.

There is claimed:

1. A method of producing spheroidal grains of silica comprising the following step:

imparting a high speed to non-spherical grains so as to maintain said non-spherical grains in substantially continuous contact with a wall that is significantly softer than silica so that abrasion of the surface of said non-spherical grains as they roll along said wall throughout the length of their path thereon imparts a substantially spherical shape to said non-spherical grains.

2. A method of making silica powder used to make optical fiber preforms, comprising the steps of:

making a suspension of silica soot in water;

gelling said suspension;

drying the gel obtained;

fractioning said gel into silica grains;

imparting a high speed so as to maintain said grains in substantially continuous contact with a wall that is significantly softer than silica so that abrasion of the surface of said grains as they roll along said wall throughout the length of their path thereon imparts a substantially spherical shape to said grains; and densifying said grains.

3. A method of producing spherically shaped grains of silica, comprising the following steps:

providing a hollow cylindrical member having a longitudinal axis which is inclined with respect to horizontal, an inside surface of said cylindrical member being softer than silica;

introducing non-spherical silica grains into said cylindrical member;

imparting motion to said non-spherical silica grains such that said grains are transported in substantially continuous contact with said inside surface to thereby impart a substantially spherical shape to said grains; and retrieving said spherically shaped grains.

4. The method of claim 3, wherein said imparting step includes the step of rotating a paddle member supported inside said cylindrical member such that at least one paddle of said paddle member contacts said grains.

* * * * *